US010666997B2

(12) United States Patent
Roberts et al.

(10) Patent No.: US 10,666,997 B2
(45) Date of Patent: May 26, 2020

(54) CLOUD BASED CONTENT ASSEMBLY METHOD AND SYSTEM

(75) Inventors: Vincent Roberts, T.O., CA (US); Daniel Siewers, Valencia, CA (US); Michael M. Martin, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 13/343,956

(22) Filed: Jan. 5, 2012

(65) Prior Publication Data

US 2013/0179916 A1 Jul. 11, 2013

(51) Int. Cl.
*H04N 21/24* (2011.01)
*H04N 21/254* (2011.01)
*H04N 21/2668* (2011.01)

(52) U.S. Cl.
CPC ....... *H04N 21/2407* (2013.01); *H04N 21/254* (2013.01); *H04N 21/2668* (2013.01)

(58) Field of Classification Search
None
See application file for complete search history.

(56) References Cited

U.S. PATENT DOCUMENTS

| 2003/0018745 A1* | 1/2003 | McGowan et al. ........... 725/125 |
| 2003/0018968 A1* | 1/2003 | Avnet ............................ 725/32 |
| 2004/0268387 A1* | 12/2004 | Wendling ...................... 725/35 |
| 2007/0157275 A1* | 7/2007 | Marcus .................. G06Q 30/02 725/113 |
| 2008/0022309 A1* | 1/2008 | Begeja et al. .................. 725/46 |
| 2008/0109853 A1* | 5/2008 | Einarsson .......... H04N 7/17318 725/62 |

(Continued)

FOREIGN PATENT DOCUMENTS

| WO | WO 00/70799 | 11/2000 |
| WO | WO 2006/076581 | 7/2006 |
| WO | WO 2007/103700 | 9/2007 |

OTHER PUBLICATIONS

Kovalick, Al "Cloud Computing for the Media Facility: Concepts and Applications" Motion Imaging Journal, Mar. 2011. pp. 20-29.

(Continued)

*Primary Examiner* — Fernando Alcon
(74) *Attorney, Agent, or Firm* — Farjami & Farjami LLP (57) ABSTRACT

There is provided a method for use by a cloud based content assembly system having a memory and a processor for assembling multiple customized linear channel streams from an assembly template. The method comprises selecting, using the processor, the assembly template from the memory, identifying the customized linear channel streams to be produced using the assembly template, and generating a virtualized assembly environment for each of the customized linear channel streams. The method further comprises provisioning each virtualized assembly environment with content assets corresponding respectively to its customized linear channel stream, and assembling the customized linear channel streams using the respective virtualized assembly environments. The cloud based content assembly system is configured to enable substantially concurrent use of shared infrastructure resources by the virtualized assembly environments.

20 Claims, 8 Drawing Sheets

(56) References Cited

U.S. PATENT DOCUMENTS

| | | | | |
|---|---|---|---|---|
| 2008/0141307 A1* | 6/2008 | Whitehead | ............ | H04N 7/173 725/46 |
| 2008/0282305 A1* | 11/2008 | Uhrig et al. | .................. | 725/114 |
| 2009/0217329 A1* | 8/2009 | Riedl | ................ | H04N 7/173 725/93 18 |
| 2010/0223392 A1* | 9/2010 | Pond | ............... | H04N 21/23424 709/231 |
| 2011/0004897 A1 | 1/2011 | Alexander | | |

OTHER PUBLICATIONS

Davies, A.S. "The Silver Lining—Utilizing Cloud Computing in Broadcast Applications" Motion Imaging Journal, Mar. 2011. pp. 30-36.

\* cited by examiner

CLOUD BASED CONTENT ASSEMBLY METHOD AND SYSTEM

BACKGROUND

Advances in communication technology and network infrastructure have conferred upon the consumers of television (TV) content a level of control over their entertainment options that would have been almost unimaginable to previous generations of viewers. Due, for example, to technology innovations enabling consumers to record programming content for delayed viewing outside of its scheduled broadcast time slot, consumers are no longer constrained by the traditional TV broadcast scheduling paradigm. Moreover, the seemingly ever-expanding selection of programming content available through cable and subscription services, for example, has enabled viewers to be highly discriminating about their viewing choices.

The empowerment of TV viewers enabled by technological advances has created substantial challenges for the providers of content attempting to market that content to a national or international audience. For example, regional, or even local differences in history, traditions, demographics, and prevailing social mores may significantly influence a viewer's decision to follow the programming offered by a particular broadcasting network, or to abandon that programming in favor of content offered by a competing network or provider. To some extent, such decisions may be based upon the quality of the core programming content. However, those decisions may also be affected by the degree to which the content, including advertising and/or promotional content delivered in conjunction with the core programming content, resonates with the values and sensibilities of viewers.

SUMMARY

There are provided methods and systems for cloud based content assembly, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely example implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

One potential solution to the challenge of securing broad based viewer loyalty for the content provided by a particular network, and perhaps the only effective approach given the degree of choice now available to consumers, is to actively court viewer favor by conforming programming content to known or identifiable viewer preferences. Implementation of that approach in a manner that is responsive to the significant variations among viewer preferences typically involves providing multiple versions of the same core content targeted to distinct viewer markets. The practicability of such a solution in the conventional production and/or content assembly environment is sharply limited, however, by the financial and infrastructure costs imposed by extension of the conventional linear content assembly model to the development of customized linear channel streams, as represented, for example, by the diagram shown in FIG. 1.

Figure 1:
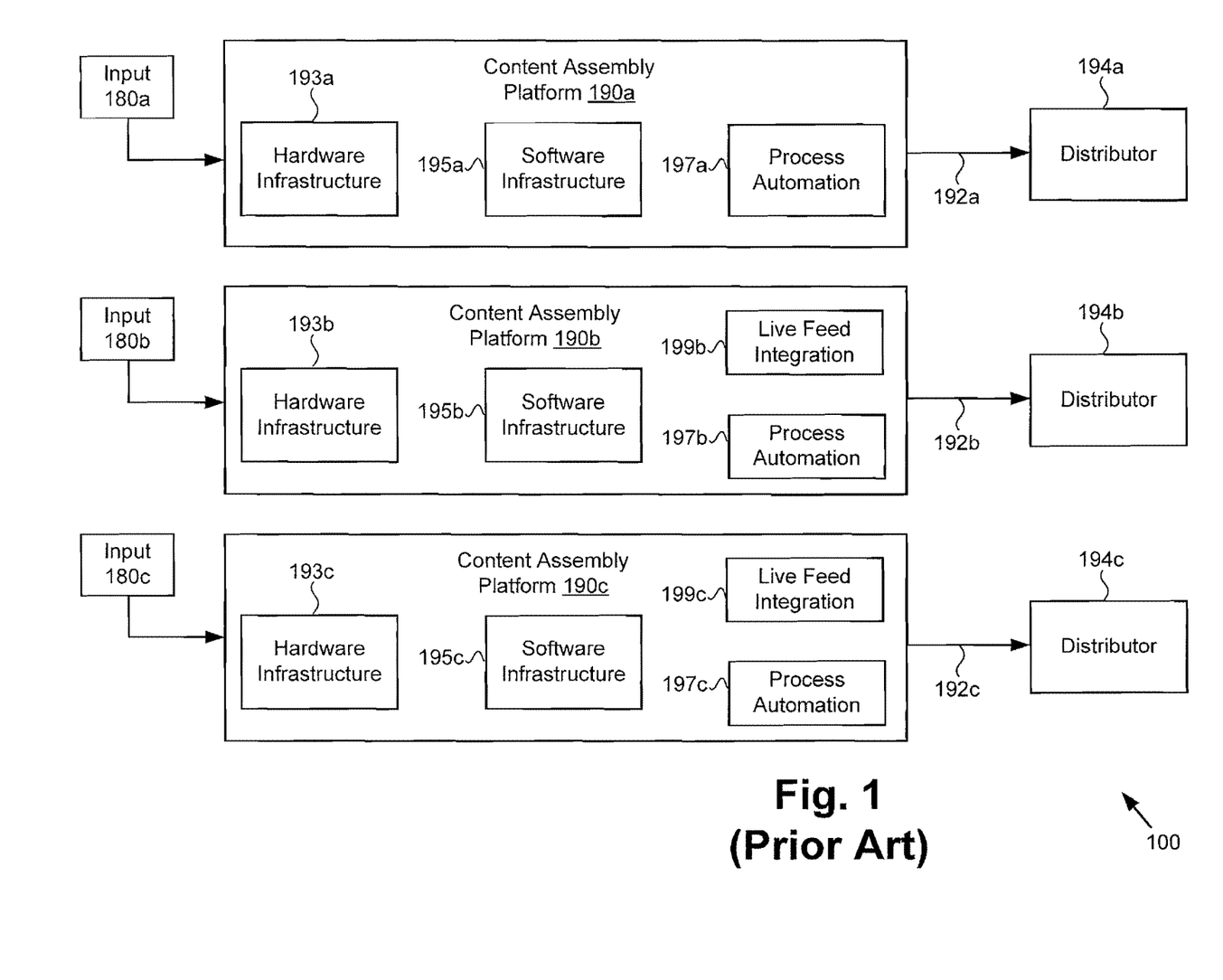
FIG. 1 is a block diagram showing a conventional infrastructure intensive linear approach to assembling programming content.

FIG. 1 is a block diagram showing a conventional infrastructure intensive linear approach to assembling programming content. Content assembly system 100 depicts assembly of three distinct customized linear channel streams 192a, 192b, and 192c, for play-out as a contribution feed to respective content distributors 194a, 194b, and 194c, corresponding to distinct market segments. According to the conventional linear assembly approach shown in FIG. 1, each customized linear channel stream requires its own dedicated assembly platform. For example, assembly of customized linear channel stream 192a requires input 180a, which may include non-live content, for example, as well as the resources of assembly platform 190a, such as hardware infrastructure 193a, software infrastructure 195a, and process automation 197a that typically requires the use of significant human resources. Analogously, assembly of customized linear channel stream 192b requires input 180b, which may include live and non-live content, for example, as well as the resources of assembly platform 190b including its own hardware infrastructure 193b, software infrastructure 195b, process automation 197b, and live feed integration 199b to accommodate the presence of live content as part of input 180b. Similarly, assembly of customized linear channel stream 192c requires input 180c, which may also include live as well as non-live content, and the resources of assembly platform 190c including hardware infrastructure 193c, software infrastructure 195c, process automation 197c, and live feed integration 199c.

As a result of the typically one-to-one relationship between a particular customized linear channel stream and the assembly platform required to support its assembly, attempts to secure and maintain viewer loyalty through the provision of multiple customized versions of substantially the same or similar core programming content comes at the cost of considerable operational complexity. In addition, the conventional one-to-one relationship between a customized linear channel stream and its dedicated assembly platform results in the imposition of significant creative comprises on the content assembly process. Moreover, the additional hardware, software, and human resources needed to produce each customized linear channel stream, which require both facilities build-out and the expenditure of as much as several millions of dollars for each conventional linear assembly platform, renders this approach prohibitively expensive beyond a very few instances of content customization.

The present application presents solutions for overcoming the present deficiencies in the art by providing a scalable virtualized content assembly environment enabling substantially concurrent production and/or assembly of multiple customized linear channel streams, using shared infrastructure resources.

Figure 2:
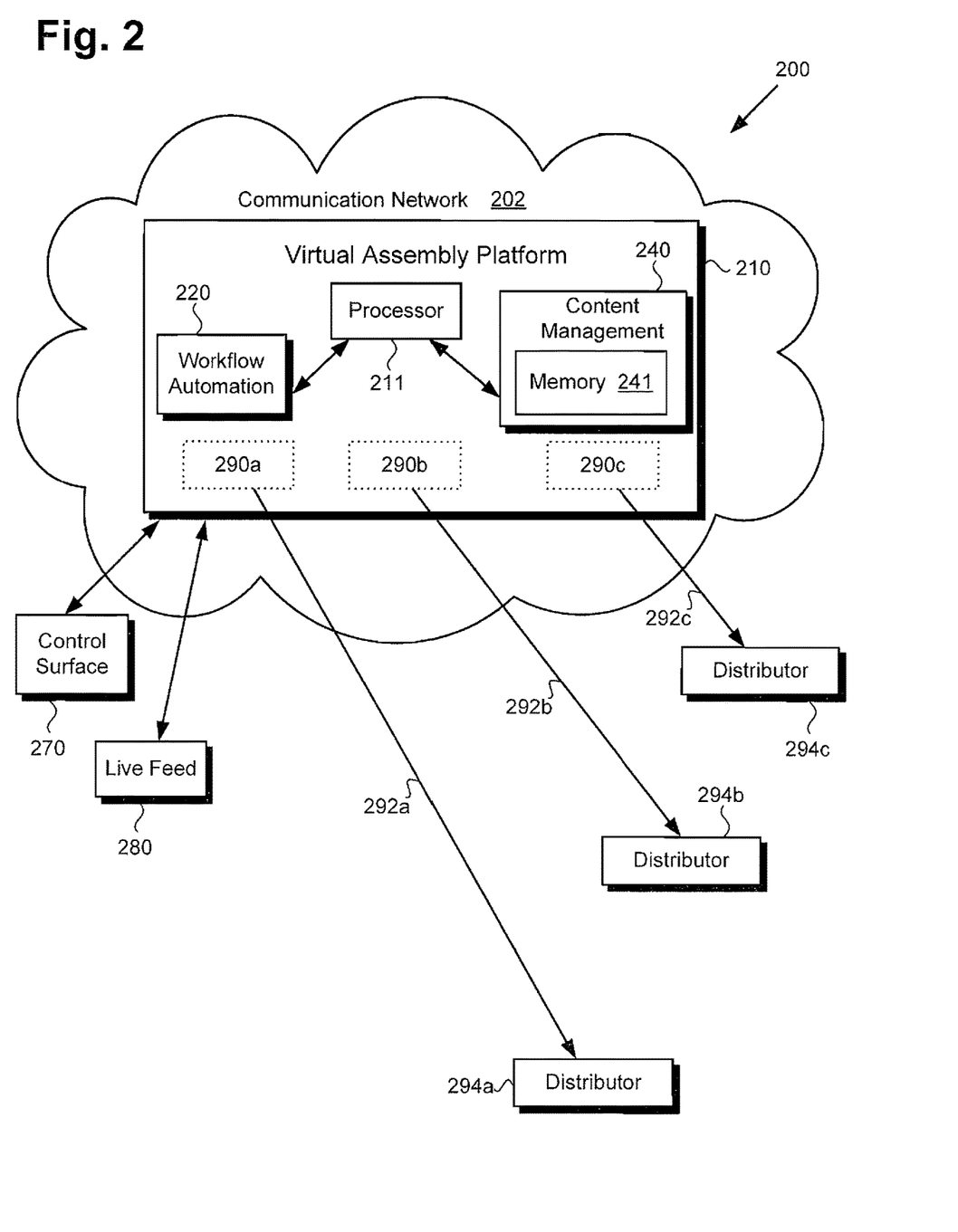
FIG. 2 is a conceptual block diagram showing an example cloud based content assembly system.

FIG. 2 is a conceptual block diagram showing an example cloud based content assembly system capable of overcoming the drawbacks and deficiencies associated with conventional linear assembly systems. Cloud based content assembly system 200 comprises virtual assembly platform 210 and shared infrastructure resources including control surface 270 and live feed 280, both of which are shown to be interactively linked to virtual assembly platform 210 through communication network, or "cloud", 202. Also shown in FIG. 2 are content distributors 294a, 294b, and 294c, receiving respective customized linear channel streams 292a, 292b, and 292c from virtual assembly platform 210.

According to the example representation shown in FIG. 2, virtual assembly platform 210 comprises processor 211, such as a central processing unit (CPU), workflow automation unit 220, and content management unit 240 including memory 241. In addition, virtual assembly platform 210, which may be a network distributed virtual assembly platform, for example, is shown to host virtualized assembly environments 290a, 290b, and 290c. Content distributors 294a, 294b, and 294c, which may comprise multichannel video programming distributors (MVPDs), as known in the art, are shown to receive respective customized linear channel streams 292a, 292b, and 292c, which may be played-out by virtual assembly platform 210 as contribution feeds to content distributors 294a, 294b, and 294c, for example.

As shown in FIG. 2, virtual assembly platform 210 is accessible over communication network 202, and may comprise a plurality of servers and databases or database libraries, either co-located or located remotely from one another and interactively linked over communication network 202. Communication network 202 may comprise a packet network, for example, such as the Internet. Alternatively, virtual assembly platform 210 may be supported by a private communication network such as a satellite distribution network, for instance, or a local area network (LAN) or other type of limited distribution network, for example. Moreover, in some implementations, communication network or cloud 202 may be a private cloud within a public network space, such as a privately hosted and secure cloud domain accessible to authorized users through the Internet.

Cloud based content assembly system 200 overcomes the limitations of conventional linear assembly models by enabling virtual assembly platform 210 to produce a plurality of customized linear channel streams, such as customized linear channel streams 292a, 292b, and 292c, for example, from an assembly template stored in memory 241 of virtual assembly platform 210. According to one aspect, virtual assembly platform 210 is configured to use processor 211, workflow automation unit 220, and content management unit 240 to select the appropriate assembly template from memory 241, to identify the plurality of customized linear channel streams 292a, 292b, and 292c desirable for play-out from virtual assembly platform 210, and to generate a virtualized assembly environment for each of customized linear channel streams 292a, 292b, and 292c, e.g., to generate virtualized assembly environment 290a for customized linear channel stream 292a, virtualized assembly environment 290b for customized linear channel stream 292b, and virtualized assembly environment 290c for customized linear channel stream 292c.

Virtual assembly platform 210 is also configured to use workflow automation unit 220 and content management unit 240 to provision each of virtualized assembly environments 290a, 290b, and 290c with content assets corresponding respectively to customized linear channel streams 292a, 292b, and 292c, and to produce customized linear channel streams 292a, 292b, and 292c using respective virtualized assembly environments 290a, 290b, and 290c. Moreover, in one implementation, processor 211 of virtual assembly platform 210 may be configured to utilize workflow automation unit 220 to participate in the production of, or to substantially produce, one or more of customized linear channel streams 292a, 292b, and 292c.

Cloud based content assembly system 200 is configured to enable substantially concurrent use of shared infrastructure resources, such as control surface 270, live feed 280, and the computing and data storage resources proved by virtual assembly platform 210, for example, by virtualized assembly environment 290a, 290b, and 290c. Moreover, virtual assembly platform 210 can be configured to close any or all instantiations of virtualized assembly environments 290a, 290b, and 290c after assembly of their respective customized linear channel streams 292a, 292b, and 292c. As a result, cloud based content assembly system 200 is capable of using virtual assembly platform 210 to selectively generate or "spin-up" multiple instantiations of virtualized assembly environments as needed, and to close or "spin-down" those virtualized assembly environments after use, resulting in a dynamically scalable, non-linear content assembly model. Furthermore, it is noted that the dynamic scalability provided by cloud based content assembly system 200 may be achieved using shared infrastructure resources, thereby avoiding the costly and time consuming process of infrastructure build-out required for scaling-up conventional linear assembly models.

Figure 3:
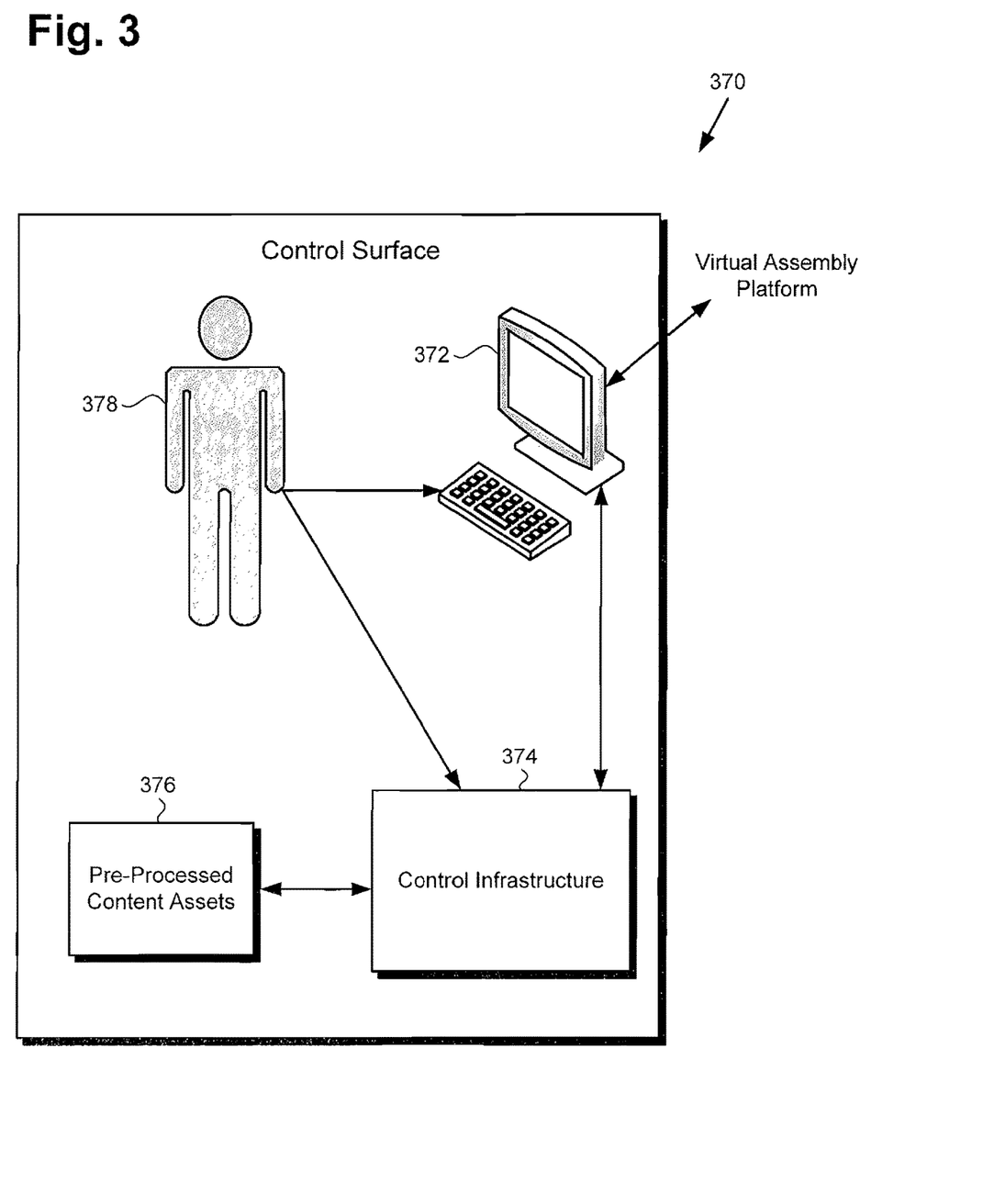
FIG. 3 shows a more detailed example of a control surface for use with a cloud based content assembly system.

Referring now to FIG. 3, FIG. 3 shows a more detailed example of control surface 370 for use with a cloud based content assembly system. According to the example shown in FIG. 3, control surface 370 includes remote user interface 372, control infrastructure 374, and pre-processed content assets 376. Also shown in FIG. 3 is human resource 378, corresponding to the contributions of one or more highly trained editors, producers, and/or technicians, for example. Control surface 370 corresponds to control surface 270, in FIG. 2, and is understood to be interactively linked to a virtual assembly platform of a cloud based content assembly system, as shown in that previous figure, through remote user interface 372, in FIG. 3. It is noted that control surface 370 may represent a physically discrete location including hardware and software infrastructure elements as control infrastructure 374. According to one aspect, for example, control surface 370 may be analogous to a physical, "brick-and-mortar," control room used for post-production editing and/or play-out of programming content in a conventional linear assembly model. However, in contrast to the conventional model, such as is represented in FIG. 1, for example, control surface 370 represents an infrastructure resource that is sharable for assembly of multiple customized linear channel streams, such as customized linear channel streams 292a, 292b, and 292c, in FIG. 2.

Although control surface 270/370 is represented as a single, physically localized, control center in FIGS. 2 and 3, that characterization is merely to simplify its conceptual presentation. More generally, control surface 270/370 may correspond to a plurality of geographically remote control surfaces interactively linked with virtual assembly platform 210 and providing one or more shared infrastructure resources for use in assembling customized linear channel streams 292a, 292b, and 292c.

Pre-processed content assets 376, in FIG. 3, may comprise "canned" content, such as previously produced programming content, advertising content, or promotional content, for example, eligible for inclusion in one or more of customized linear channel streams 292a, 292b, and 292c. In addition to, or in lieu of, the features attributed to control surface 370 by the representation shown in FIG. 3, various implementations of control surface 370 may include other features, also interactively linked to virtual assembly platform 210 through remote user interface 372, and configured to provide, for instance, scheduling, traffic control, billing, feed monitoring, automation management, graphics provisioning, captioning data, secondary audio programming such as foreign language and descriptive video enhancements, audio voice over, and management of near-live or live feed assets available, for example, from live feed 280, in FIG. 2.

Figure 4:
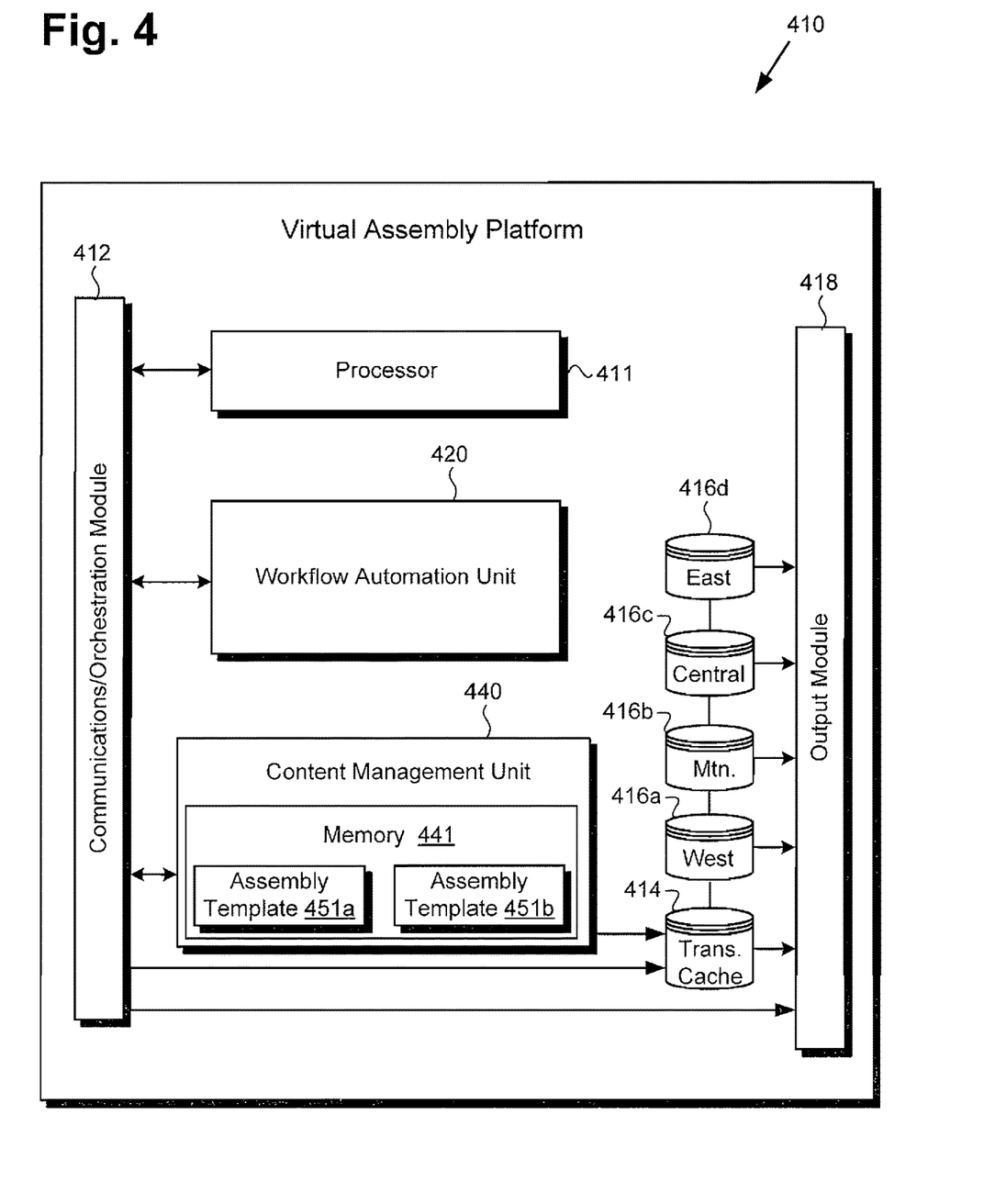
FIG. 4 shows a diagram of an example virtual assembly platform of a cloud based content assembly system.

Continuing to FIG. 4, FIG. 4 shows a diagram of example virtual assembly platform 410 of a cloud based content assembly system. As shown in FIG. 4, virtual assembly platform 410 comprises processor 411, workflow automation unit 420 and content management unit 440 including memory 441, which is shown to store assembly templates 451a and 451b. Virtual assembly platform 410 comprising processor 411, workflow automation unit 420, and content management unit 440 including memory 441 corresponds to virtual assembly platform 210 comprising processor 211, workflow automation unit 220, and content management unit 240 including memory 241, in FIG. 2. In addition to processor 411, workflow automation unit 420, and content management unit 440, virtual assembly platform 410 is shown to further comprise communications/orchestration module 412, transport stream cache 414, west coast audience delay 416a, mountain audience delay 416b, central zone audience delay 416c, east coast audience delay 416d, and output module 418 for mediating play-out of one or more customized linear channel streams, such as customized linear channel streams 292a, 292b, and/or 292c, in FIG. 2. For example, virtual assembly platform 410 can be configured to impose regional blackouts for sports programming according to the geographic regions served by content distributors 294a, 294b, and 294c to which respective customized linear channel streams 292a, 292b, and 292c are directed.

Figure 5:
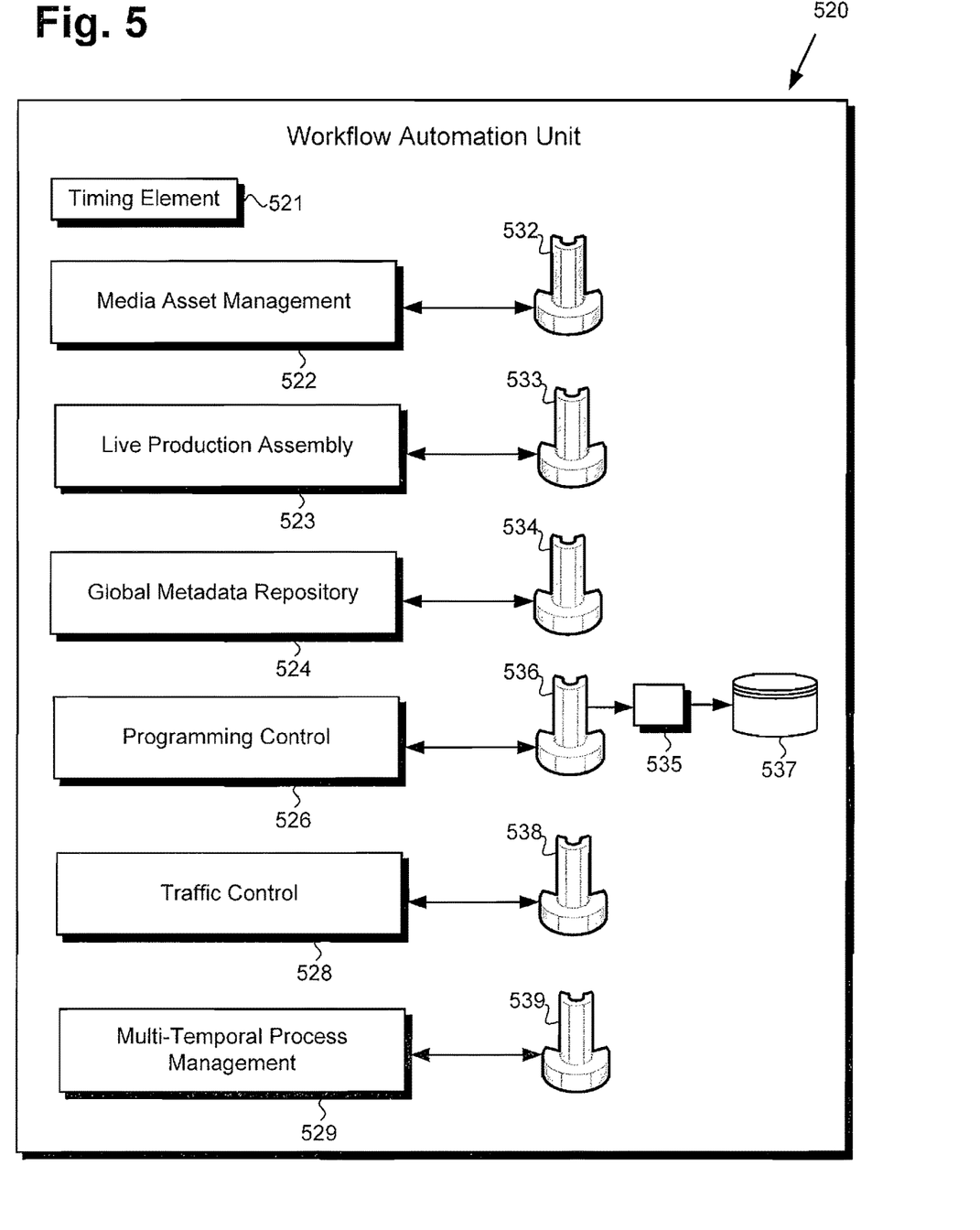
FIG. 5 shows a diagram of an example workflow automation unit of a virtual assembly platform implemented as part of a cloud based content assembly system.
Figure 6A:
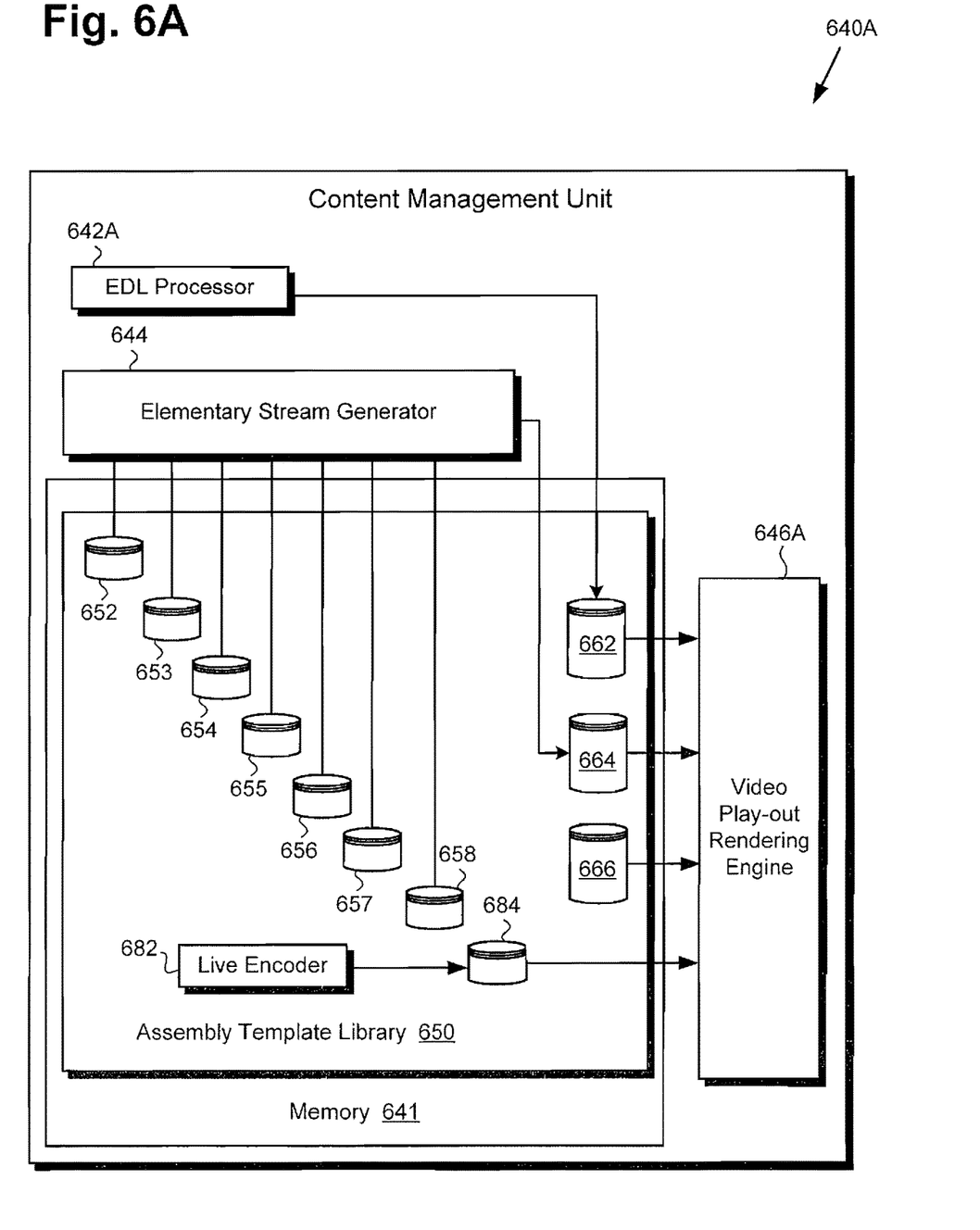
FIG. 6A shows a diagram of an example content management unit of a virtual assembly platform implemented as part of a cloud based content assembly system.
Figure 6B:
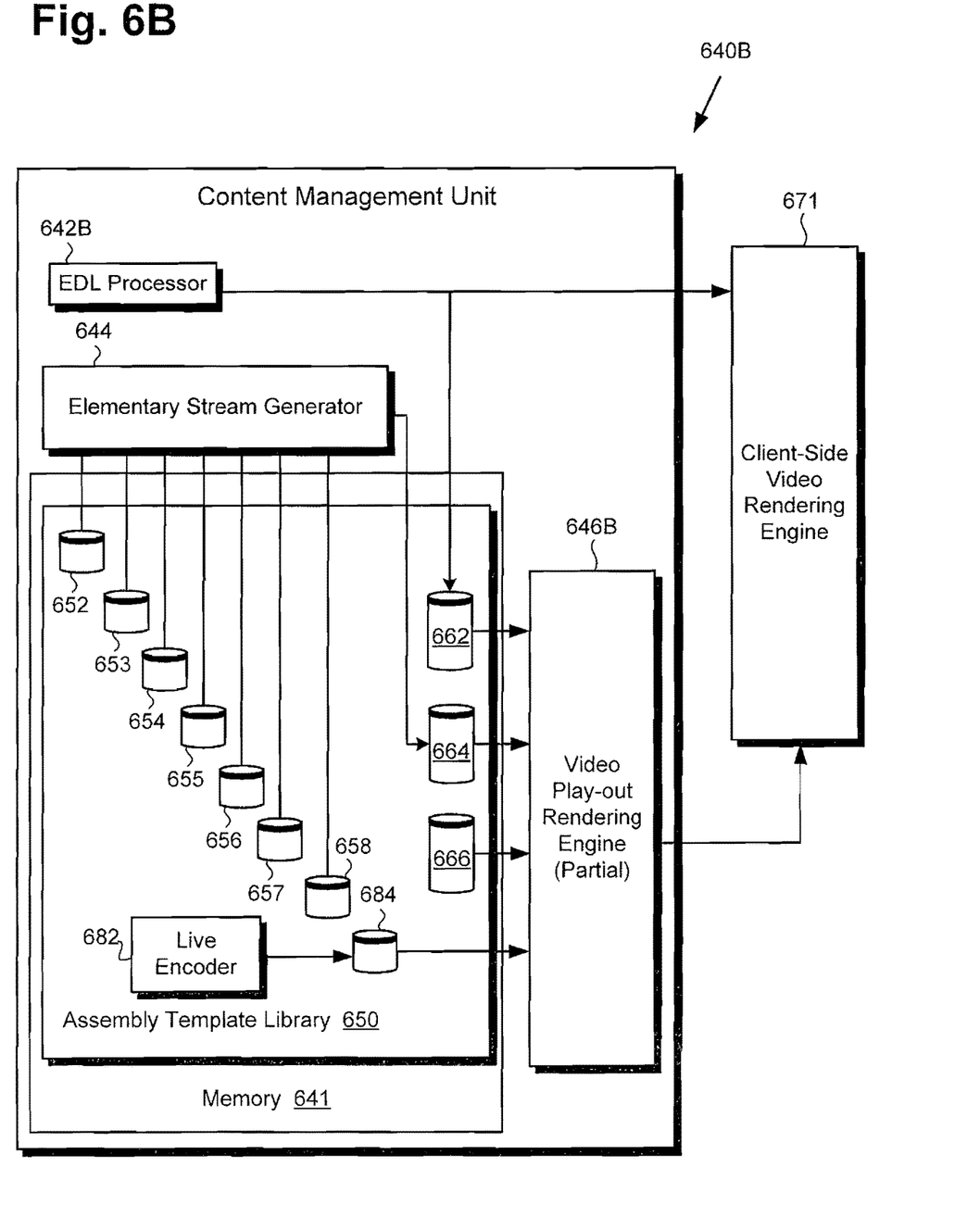
FIG. 6B shows another example implementation of a content management unit of a virtual assembly platform implemented as part of a cloud based content assembly system.

Although further details of workflow automation unit 420 and content management unit 440, in FIG. 4, will be provided in conjunction with FIGS. 5, 6A, and 6B, respectively, it is noted that communications/orchestration module 412 is implemented as a communications and data bus for virtual assembly platform 410, and may also serve as the input portal for communications between virtual assembly platform 410 and the shared infrastructure resources represented by control surface 270 and live feed 280, in FIG. 2. Moreover, although communications/orchestration module 412, in FIG. 4, is shown to be interactively linked to workflow automation unit 420 as an integral whole, and is similarly shown to be interactively linked with content management unit 440 as an integral whole, that interactive linkage is merely representational, and can, in practice, extend individually to each internal component of workflow automation unit 420 and content management unit 440. In other words, in addition to mediating communication among processor 411, workflow automation unit 420, and content management unit 440, as a whole, communications/orchestration module 412 may also be used to mediate communications among constituent elements within each of workflow automation unit 420 and content management unit 440, and between those constituent elements and processor 411. Additional aspects of workflow automation are described by U.S. Pat. No. 7,996,488 B1 entitled "Systems and Methods for Interconnecting Media Applications and Services with Automated Workflow Orchestration," which is hereby incorporated by reference in its entirety.

Referring to FIG. 5, FIG. 5 shows a diagram of example workflow automation unit 520 of a virtual assembly platform implemented as part of a cloud based content assembly system. Workflow automation unit 520 corresponds to workflow automation unit 220/420, in respective FIGS. 2 and 4. As shown in FIG. 5, example workflow automation unit 520 comprises timing element 521, media asset management module 522, live production assembly module 523, global metadata repository module 524, programming control module 526, traffic control module 528, and multi-temporal workflow process automation module 529.

It is noted that timing element 521 may include a variety of real-time tools and be configured to perform a corresponding variety of real-time practices, as known in the art. It is further noted that, although not expressly shown in FIG. 5, each of timing element 521, media asset management module 522, live production assembly module 523, global metadata repository module 524, programming control module 526, traffic control module 528, and multi-temporal workflow process automation module 529 can be interactively linked to each other and to a content management unit (not shown in FIG. 5) through a communications/orchestration module external to workflow automation unit 520, such as communications/orchestration module 412, in FIG. 4. Such interactive linking of the internal assets of workflow automation unit 520 with other resources of virtual assembly platform 210/410, additional details of which will be further provided by reference to FIGS. 6A and 6B below, enables workflow automation unit 520 to exercise substantial control over the content assembly process performed using virtual assembly platform 210/410.

As further shown in FIG. 5, example workflow automation unit 520 comprises media asset management database 532 interactively linked to media asset management module 522, live production asset database 533 interactively linked to live production assembly module 523, global metadata repository database 534 interactively linked to global metadata repository module 524, programming database 536 interactively linked to programming control module 526, traffic database 538 interactively linked to traffic control module 528, and automation database 539 interactively linked to multi-temporal workflow process automation module 529. Also included in workflow automation unit 520 is system protocol unit 535, which may include a program and system information protocol (PSIP) generator, for example, and repository 537, which may include a PSIP table, for example.

Moving to FIG. 6A, FIG. 6A shows a diagram of example content management unit 640A of a virtual assembly platform implemented as part of a cloud based content assembly system, and shown to include memory 641. Content management unit 640A including memory 641 corresponds to content management unit 240/440 including memory 241/441, in respective FIGS. 2 and 4. As shown in FIG. 6A, memory 641 includes assembly template library 650, and content management unit 640 further comprises edit decision list (EDL) processor 642A and elementary stream generator 644 coupled to memory 641, as well as video play-out rendering engine 646A receiving outputs from memory 641.

According to the example implementation shown in FIG. 6A, assembly template library 650 of memory 641 comprises content storage including, for example, graphic elements storage 652, squeeze back video file storage 653, closed caption file storage 654, audio voice over file storage 655, language tracks and descriptive video file storage 656, ratings data storage 657, and local availability data storage 658, accessible by corresponding components internal to elementary stream generator 644 (corresponding components of elementary stream generator 644 not explicitly shown in FIG. 6A). According to one implementation, for example, assembly template library 650 may have available therein complementary left eye video and right eye video elements for enabling three-dimensional (3D) rendering of video content.

As further shown in FIG. 6A, assembly template library 650 also comprises stream playlist file cache 662, elementary stream file cache 664, mezzanine programming and video file cache 666, live encoder 682, and live cache 684. It is noted that, although not expressly shown in FIG. 6A, each of EDL processor 642A, elementary stream generator 644, and the internal features of assembly template library 650 described above can be interactively linked to each other and to a workflow automation unit (not shown in FIG. 6A) through a communications/orchestration module external to content management unit 640A, such as communications/orchestration module 412, in FIG. 4. In addition, such a communications/orchestration module can also be used to mediate delivery of live feed data from a live feed, such as live feed 280, in FIG. 2, to live production assembly module 523, in FIG. 5, and/or live encoder 682, in FIG. 6A.

Referring to FIG. 6B, FIG. 6B shows another example implementation of a content management unit of a virtual assembly platform as content management unit 640B, in combination with remote client-side video rendering engine 671, which may be a software module implemented on a client-side system such as a user home entertainment system, or a mobile communication device supporting video playback, for example. In contrast to the implementation shown previously in FIG. 6A, video play-out rendering engine 646B of content management unit 640B is configured to only partially render video content before play-out to the client side system including client-side video rendering engine 671. According to the present implementation, for example, EDL processor 642B may be configured to control further rendering of video content on the client-side system directly by client-side video rendering engine 671.

Figure 7:
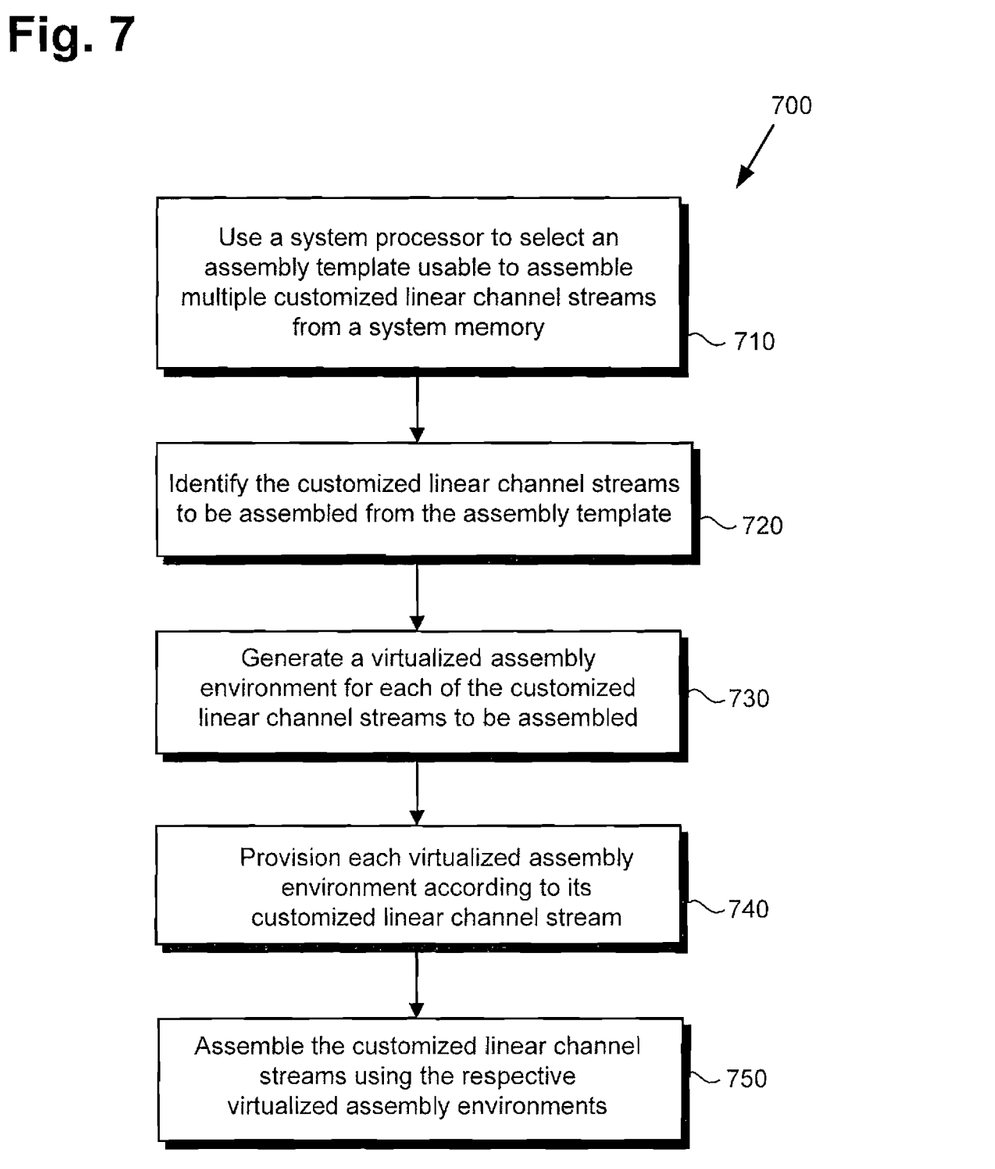
FIG. 7 is a flowchart presenting an example method for use by a cloud based content assembly system.

The functionality of a cloud based content assembly system implemented according to the principles disclosed by the present application, such as cloud based content assembly system 200, in FIG. 2, as well as that of the example cloud based content assembly system elements shown by FIGS. 3, 4, 5, 6A, and 6B, will be further described by reference to FIG. 7. FIG. 7 presents flowchart 700 describing an example method for use by a cloud based content assembly system, such as cloud based content assembly system 200, in FIG. 2, for assembling a plurality of customized linear channel streams from an assembly template. Certain details and features have been left out of flowchart 700 that are apparent to a person of ordinary skill in the art. For example, a step may consist of one or more substeps or may involve specialized equipment or materials, as known in the art. While steps 710 through 750 in FIG. 7 are sufficient to describe a particular example of the present method, other examples may utilize steps different from those shown in flowchart 700, or may include more, or fewer, steps.

Referring to step 710 in FIG. 7 in combination with cloud based content assembly system 200, in FIG. 2, step 710 of flowchart 700 comprises using a system processor to select an assembly template usable to produce multiple customized linear channel streams from a system memory. Step 710 may be performed by processor 211 of virtual assembly platform 210, either autonomously, using workflow automation unit 220 and content management unit 240, or, for instance, in response to instruction data received from control surface 270. Referring to FIG. 4, for example, step 710 may correspond to selection of one of assembly templates 451a or 451b from memory 441.

Continuing to step 720 in FIG. 7, step 720 of flowchart 700 comprises identifying the customized linear channel streams to be produced and/or assembled using the assembly template selected in step 710. Step 720 may be performed by processor 211 using workflow automation unit 220, in FIG. 2, for example, through identification of customized linear channel streams 292a, 292b, and 292c to be provided respectively to content distributors 294a, 294b, and 294c. As previously explained, a solution to the challenge of securing broad based viewer loyalty for the programming content provided by a programming source, such as cloud based content assembly system 200, is to conform the programming content to known or identifiable viewer preferences. Implementation of that approach in a manner that is responsive to the significant variations among viewer preferences typically involves assembling multiple versions of the same core programming content targeted to distinct viewer markets. Such an approach is represented by step 720, wherein variations in viewer preferences among those viewers served by each of content distributors 294a, 294b, and 294c are specifically addressed through identification of customized linear channel streams 292a, 292b, and 292c directed respectively to those variant viewer preferences.

Moving to step 730, in FIG. 7, with continued reference to cloud based content assembly system 200, in FIG. 2, step 730 of flowchart 700 comprises generating a virtualized assembly environment for each of customized linear channel streams 292a, 292b, and 292c. Step 730 may be performed by processor 211 of virtual assembly platform 210, using workflow automation unit 220 and content management unit 240, for example, to generate virtualized assembly environments 290a, 290b, and 290c, corresponding respectively to customized linear channel streams 292a, 292b, and 292c. It is noted that because step 730 of flowchart 700 results in generation of the multiple virtualized assembly environments 290a, 290b, and 290c, the present method can be used to generate one virtualized assembly environment, three virtualized assembly environments as shown in FIG. 2, or a vastly larger number of virtualized assembly environments, such as hundreds or thousands of virtualized assembly environments, the number being limited only by the computing resources and shared infrastructure resources available to cloud based content assembly system 200.

Continuing with step 740 of flowchart 700, step 740 comprises provisioning virtualized assembly environments 290a, 290b, and 290c, in FIG. 2, with content assets according to the needs of respective corresponding customized linear channel streams 292a, 292b, and 292c. Step 740 may be performed by processor 211 of virtual assembly platform 210, using workflow automation unit 220 and content management unit 240, for example, and may include provisioning each of virtualized assembly environments 290a, 290b, and 290c with pre-processed content assets, such as previously produced programming content, advertising content, and/or promotional content targeted to the prospective viewers of respective customized linear channel streams 292a, 292b, and 292c. Such pre-processed content assets may initially be received by virtual assembly platform 210 as preprocessed content assets 376, from control surface 370, in FIG. 3, for example, and may then be sorted and stored in graphic elements storage 652, squeeze back video file storage 653, closed caption file storage 654, audio voice over file storage 655, language tracks and descriptive video file storage 656, ratings data storage 657, and/or local availability data storage 658 of assembly template library 650, in memory 641 of FIGS. 6A and 6B, for provisioning by elementary stream generator 644.

Alternatively, or in addition, provisioning of content assets in step 740 of flowchart 700 may include receiving a live feed, for example from live feed 280, in FIG. 2. Referring to FIGS. 2, 4, 6A, and 6B in combination, live feed data received from live feed 280 may be routed to live production assembly module 523 of workflow automation unit 520, and live encoder 682 of content management unit 640A/640B by communications/orchestration module 412. The encoded live feed data can then be provisioned to one or more of virtualized assembly environments 290a, 290b, and 290c from live cache 684 for inclusion in any of respective customized linear channel streams 292a, 292b, and 292c. Moreover, in some implementations, live feed data received from live feed 280 may be provisioned to one or more of customized linear channel streams 292a, 292b, or 292c as real-time content assets during play-out of customized linear channel streams 292a, 292b, or 292c by video play-out rendering engine 646A, in FIG. 6A, or video play-out rendering engine 646B, in FIG. 6B, for example.

Moving to step 750, in FIG. 7, step 750 of flowchart 700 comprises assembling customized linear channel streams 292a, 292b, and 292c using respective virtualized assembly environments 290a, 290b, and 290c. Step 750 may be performed by processor 211 of virtual assembly platform 210, using workflow automation unit 220 and content management unit 240, for example, and may comprise merging each of an instantiation of the assembly template selected in step 710 for inclusion in customized linear channel streams 292a, 292b, and 292c with the content assets provisioned respectively to virtualized assembly environments 290a, 290b, and 290c, in step 740. Thus each of customized linear channel streams 292a, 292b, and 292c may comprise a unique combination of live feed content, and pre-processed content such as programming content, advertising content, and promotional content, for example, according to the known or anticipated viewer preferences of the prospective viewers of customized linear channel streams 292a, 292b, and 292c. Moreover, it is noted that because step 750 is performed by virtual assembly platform 210 using virtualized assembly environments 290a, 290b, and 290c, the present method can be used to advantageously produce multiple customized linear channel streams, such as customized linear channel streams 292a, 292b, and 292c, substantially concurrently, using shared infrastructure and computing resources of cloud based content assembly system 200.

Although not shown in flowchart 700, in FIG. 7, a method for use by a cloud based content assembly system for assembling a plurality of customized linear channel streams from an assembly template may further include play-out of one or more of customized linear channel streams 292a, 292b, and 292c, in FIG. 2, to its respective content distributor 294a, 294b, or 294c. Play-out of one or more of customized linear channel streams 292a, 292b, and 292c may be performed by virtual assembly platform 410, using video play-out rendering engine 646A/646B of corresponding content management unit 640A/640B, in respective FIGS. 6A and 6B, and output module 418, in FIG. 4.

In addition, virtual assembly platform 210, in FIG. 2, can be configured to produce or otherwise dynamically modify customized linear channel streams 292a, 292b, and 292c in real-time, during play-out, for example, by modifying or exchanging content assets previously included in customized linear channel streams 292a, 292b, and 292c during assembly step 750 of flowchart 700. For example, referring to FIG. 6A/6B, as suggested above, content management unit 640A/640B, under the control workflow automation unit 520, in FIG. 5, can be configured to provision live feed data from live cache 684 as real-time content assets during play-out of one or more of customized linear channel streams 292a, 292b, or 292c, in FIG. 2, by video play-out rendering engine 646A/646B. Furthermore, implementations in which a time delay, such as a thirty second time delay, for example, is utilized between assembly step 750, in FIG. 7, and play-out of customized linear channel streams 292a, 292b, and 292c, in FIG. 2, multi-temporal workflow process automation module 529 of workflow automation unit 520, in FIG. 5, may be employed to dynamically change or correct content assets included in customized linear channel streams 292a, 292b, and 292c, either prior to, or during, play-out.

Thus, the present application discloses a cloud based content assembly method and system configured to enable substantially concurrent use of shared infrastructure resources by multiple instantiations of virtualized assembly environments generated by a virtual assembly platform, to produce multiple customized linear channel streams from a single assembly template. In addition, the virtual assembly platform can be configured to close any or all of the instantiations of the virtualized assembly environments after assembly of their respective customized linear channel streams. As a result, the disclosed cloud based content assembly method and system provides a dynamically scalable non-linear content assembly model offering significant advantages over the conventional art. Moreover, the dynamic scalability enabled by the present disclosure may be achieved using shared infrastructure resources, thereby avoiding the costs and delays associated with physical infrastructure build-out.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementation described herein, but many rearrangements, modifications, and substitutions are possible without departing from the present disclosure.

What is claimed is:

1. A method for use by a cloud based content assembly system having a memory and a processor for assembling a plurality of customized linear channel streams from an assembly template, the method comprising:
  selecting, using the processor, the assembly template from the memory;
  identifying the plurality of customized linear channel streams based on respective viewer preferences of each of the plurality of customized linear channel streams to be assembled using the assembly template;
  spinning-up virtualized assembly environments each corresponding to one of the plurality of customized linear channel streams;
  provisioning each of the virtualized assembly environments with content assets for inclusion in each of the plurality of customized linear channel streams corresponding respectively to each of the virtualized assembly environments, wherein the content assets provisioned for inclusion in each of the plurality of customized linear channel streams vary based on needs of each of the plurality of customized linear channel streams;
  assembling, using the assembly template, the plurality of customized linear channel streams each using a respective one of the virtualized assembly environments by merging each of a plurality of instantiations of the assembly template with the content assets corresponding to each of the customized linear channel streams;
  after assembling the plurality of customized linear channel streams, spinning-down the virtualized assembly environments;
  playing-out the plurality of customized linear channel streams to a plurality of content distributors; and
  dynamically changing content assets included in at least one of the plurality of customized linear channel streams during the playing-out by exchanging content assets previously included in the at least one of the plurality of customized linear channel streams with a live content feed during the playing-out.

2. The method of claim 1, wherein the cloud based content assembly system is further configured to produce at least one of the plurality of customized linear channel streams.

3. The method of claim 1, wherein the cloud based content assembly system is configured to enable substantially concurrent use of shared infrastructure resources by the virtualized assembly environments.

4. The method of claim 1, wherein the selecting comprises selecting the assembly template from a template library of the cloud based content assembly system.

5. The method of claim 1, wherein the provisioning comprises acquiring at least a subset of the content assets from a content storage of the cloud based content assembly system, and wherein the subset of the content assets include a video programming.

6. The method of claim 1, wherein the customized linear channel streams comprise real-time content assets provisioned during the playing-out.

7. The method of claim 1, wherein the plurality of customized linear channel streams vary from one another based on the content assets being merged with each of the plurality of instantiations of the assembly template for assembling each of the customized linear channel streams.

8. A cloud based content assembly system capable of assembling a plurality of customized linear channel streams from an assembly template, the cloud based content assembly system comprising:
  a virtual assembly platform having a memory and processor and being accessible over a communication network;
  infrastructure resources interactively linked to the virtual assembly platform;
  the processor configured to:
    select the assembly template from the memory;
    identify the plurality of customized linear channel streams based on respective viewer preferences of each of the plurality of customized linear channel streams to be assembled using the assembly template;
    spin-up virtualized assembly environments each corresponding to one of the plurality of customized linear channel streams;
    provision each of the virtualized assembly environments with content assets for inclusion in each of the plurality of customized linear channel streams corresponding respectively to each of the virtualized assembly environments, wherein the content assets provisioned for inclusion in each of the plurality of customized linear channel streams vary based on needs of each of the plurality of customized linear channel streams;
    assemble, using the assembly template, the plurality of customized linear channel streams each using a respective one of the virtualized assembly environments by merging each of a plurality of instantiations of the assembly template with the content assets corresponding to each of the customized linear channel streams;
    after the plurality of customized linear channel streams are assembled, spin-down the virtualized assembly environments;
    play-out the plurality of customized linear channel streams to a plurality of content distributors; and
    dynamically change content assets included in at least one of the plurality of customized linear channel streams during the playing-out by exchanging content assets previously included in the at least one of the plurality of customized linear channel streams with a live content feed during the playing-out.

9. The cloud based content assembly system of claim 8, wherein the processor is further configured to produce at least one of the plurality of customized linear channel streams.

10. The cloud based content assembly system of claim 8, wherein the cloud based content assembly system is configured to enable substantially concurrent use of the shared infrastructure resources by the virtualized assembly environments.

11. The cloud based content assembly system of claim 8, wherein the assembly template is selected from a template library of the virtual assembly platform.

12. The cloud based content assembly system of claim 8, wherein the processor is configured to provision the virtualized assembly environments by acquiring at least a subset of the content assets from a content storage of the virtual assembly platform, and wherein the subset of the content assets include a video programming.

13. The cloud based content assembly system of claim 8, wherein the customized linear channel streams comprise real-time content assets provisioned during the play-out.

14. The cloud based content assembly system of claim 8, wherein the plurality of customized linear channel streams vary from one another based on the content assets being merged with each of the plurality of instantiations of the assembly template for assembling each of the customized linear channels streams.

15. The method of claim 1, wherein the cloud based content assembly system is configured to enable substantially concurrent use of shared infrastructure resources, including the live content feed, by the virtualized assembly environments for concurrently assembling the plurality of customized linear channel streams.

16. The cloud based content assembly system of claim 8, wherein the cloud based content assembly system is configured to enable substantially concurrent use of shared infrastructure resources, including the live content feed, by the virtualized assembly environments for concurrently assembling the plurality of customized linear channel streams.

17. The method of claim 1, wherein the virtual assembly platform further comprises west coast audience delay, mountain audience delay, central zone audience delay, and east coast audience delay, wherein the processor is further configured to mediate the playing-out of at least one of the plurality of customized linear channel streams according to a geographic region served by at least one of the plurality of content distributors.

18. The method of claim 1, wherein each of the plurality of customized linear channel streams comprises a same core programming content targeted to distinct viewer markets.

19. The method of claim 1, wherein each of the plurality of customized linear channel streams comprises a unique combination of live feed content, and pre-processed content including at least one of programming content, advertising content, or promotional content based on at least one of known or anticipated viewer preferences of prospective viewers of each of the customized linear channel streams.

20. The method of claim 1, further comprising:

dynamically changing content assets included in at least one of the plurality of customized linear channel streams, before the playing-out of the plurality of customized linear channel streams, during a time delay between the assembling and the playing-out of the plurality of customized linear channel streams.

\* \* \* \* \*